Figure 1:
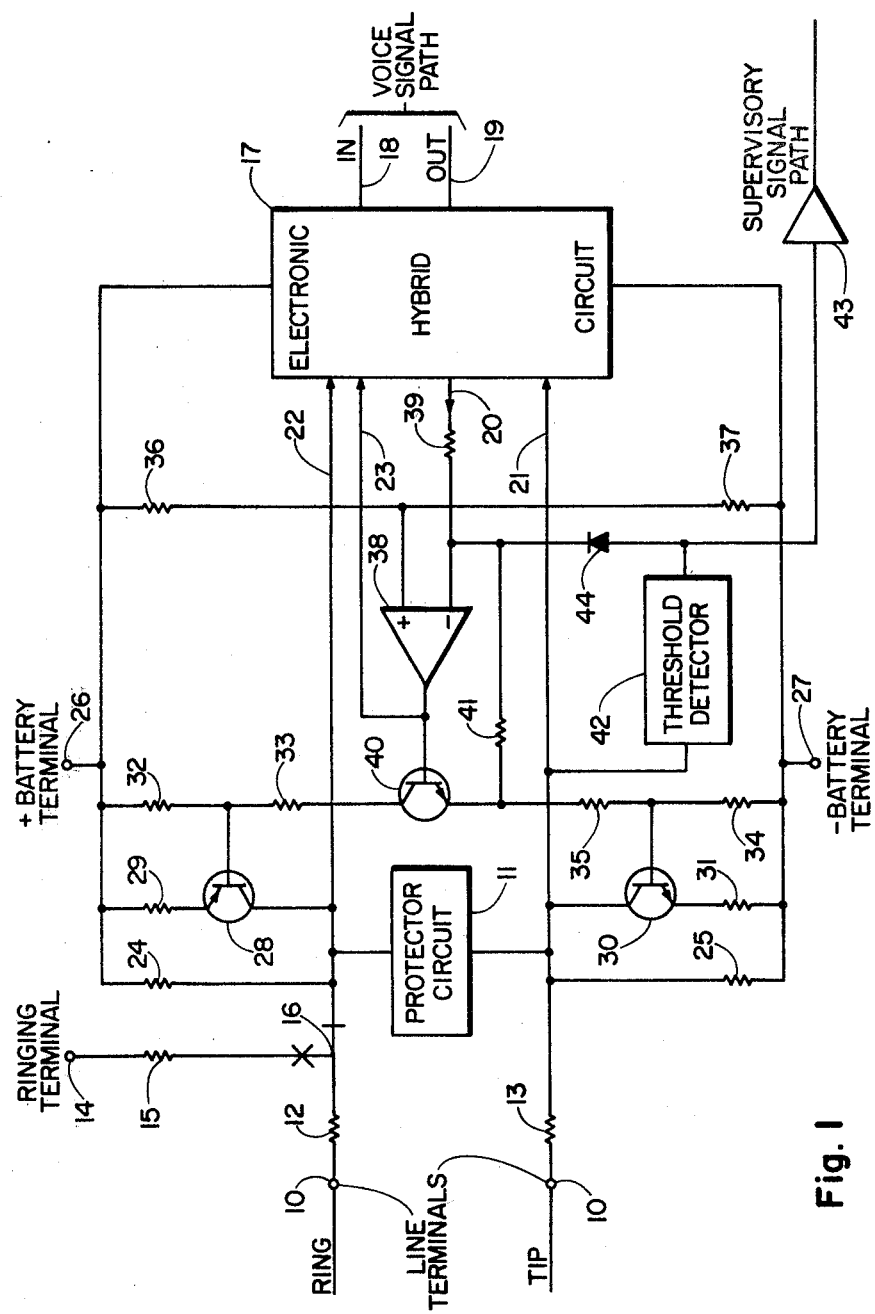

United States Patent [19]

Mein et al.

[11] 4,322,586
[45] Mar. 30, 1982

[54] TRANSFORMERLESS LINE INTERFACE CIRCUIT

[75] Inventors: Gordon F. Mein, Ottawa; John B. Terry, Carp, both of Canada

[73] Assignee: Northern Telecom Limited, Montreal, Canada

[21] Appl. No.: 206,630

[22] Filed: Nov. 13, 1980

[51] Int. Cl.³ .................. H04B 1/58; H04M 19/06; H04Q 3/18
[52] U.S. Cl. .................. 179/170 NC; 179/16 AA
[58] Field of Search ........... 179/18 F, 18 FA, 170 R, 179/170 NC, 170 D, 170 T, 170 G, 70, 77, 16 A, 16 AA, 81 R; 178/70 R, 71 R

[56] References Cited

U.S. PATENT DOCUMENTS

| | | | |
|---|---|---|---|
| 4,004,109 | 1/1977 | Boxall | 179/170 NC |
| 4,041,252 | 8/1977 | Cowden | 179/170 NC |
| 4,174,470 | 11/1979 | Seidel | 179/170 NC |
| 4,178,485 | 12/1979 | Cowpland | 179/18 FA |
| 4,181,824 | 1/1980 | Seidel | 179/170 D |
| 4,203,009 | 5/1980 | Tattersall | 179/16 AA |
| 4,203,012 | 5/1980 | Boxall | 179/170 NC |

OTHER PUBLICATIONS

XC3419 Subscriber Loop Interface Circuit Motorola Semiconductor, Box 20912, Phoenix, Ariz. 85036.
3081–3082 to 3084–3085 Subscriber Line Interface Circuits ITT North Deerfield Beach, Fla. (1979).

Primary Examiner—Thomas A. Robinson
Attorney, Agent, or Firm—J. E. Moorhouse

[57] ABSTRACT

A line circuit includes a fixed resistance feed consisting of a pair of resistors connected in series with a d.c. power source and tip and ring leads of a communication line. A variable current feed includes a current sink and a current source also connected in series with the d.c. power source and the TIP and RING leads. Energizing current flow in the communication line results as the combination of currents passed by the two feeds. A control circuit determines the currents conducted by the current source and current sink and introduces variations in these currents in accordance with signals for transmission along the communication line. Differences between current flows in the variable current feed and current imbalance conditions on the communication line are accommodated by the fixed resistance feed which also determines the terminating impedance for the communication line.

7 Claims, 1 Drawing Figure

TRANSFORMERLESS LINE INTERFACE CIRCUIT

The invention relates to interface circuits for communication lines and particularly to a line circuit for supplying energizing current and a.c. signals to a pair of leads in a communication line.

In telephony, a subscriber loop has typically been provided by a communication line having a pair of leads for connecting a remote station set to the telephone network. The communication line is terminated at a line circuit which traditionally includes a transformer having windings for coupling a.c. signals between the communication line and a port associated with a telephone switching facility in the telephone network. One of the windings in the transformer is connected to the leads and usually provides a d.c. path for supplying energizing current to the communication line. Supervisory circuitry usually associated with the line circuit is responsive to variations in the flow of energizing current to indicate ON HOOK and OFF HOOK conditions at the station set, and to detect dial pulses transmitted by the station set.

As the transformer tends to be the most expensive element in a line circuit, it has been a long standing objective of telephony circuit designers to either reduce the size of the transformer or eliminate it altogether. Various transformerless line circuits have been developed. These transformerless line circuits may be categorized in two groups in accordance with some of their common characteristics. In one group, a.c. signals and d.c. energizing current are supplied by a pair of very closely matched current regulating circuits sometimes referred to as current mirrors. Some examples of circuits in this category are described by Frank S. Boxall in U.S. Pat. Nos. 4,004,109 and 4,203,012 issued on Jan. 18, 1977 and on May 13, 1980 respectively and in a description of a circuit designated as XC3419, the circuit description having been published by Motorola Semiconductor, Box 20912, Phoenix, Ariz. 85036. In the other category, high impedance electrodes of complementary transistors are connected to provide a current source and a current sink for connection at opposite leads in the communication line. Current regulation is obtained by voltages applied at associated base electrodes in conjunction with matched emitter resistors. Some examples of circuits in this category are described by Earl Thomas Cowden in U.S. Pat. No. 4,041,252 issued on Aug. 9, 1977 and by Graham D. Tattersall in U.S. Pat. No. 4,203,009, issued on May 13, 1980.

Line circuits having a pair of current regulators in series with the tip and ring lead of a communication line are capable of supplying a preferred constant current for energizing the line. However if there is less current available at one of the current regulators than is normally regulated, the regulator tends to saturate, becoming dynamically non-functional. Additional circuitry is required to reduce the probability of either of the current regulators becoming saturated. Saturation tends to occur because of current imbalance as between the tip and ring leads of the operating communication line. Such imbalance can occur through a leakage to ground somewhere along the communication line and also through intentional imbalance introduced in a remote station set associated with the communication line. Imbalance can also occur directly in the line circuit because of deviation from necessarily narrow tolerances in circuit components. Of course when either of the current regulators becomes saturated, its a.c. impedance becomes virtually nil, obviating further use of the communication line until repair or replacement of the line circuit is effected. Line circuits in these categories have not yet found general acceptance in operating telephone companies as compared to line circuits of the transformer type.

In accordance with the present invention the problem of saturation in one or the other of the current regulators feed paths in a transformerless line circuit is overcome by providing a pair of resistive feed elements for supplying some of the energizing current to the communication line. Current regulators are provided by current source and sink paths. These current paths conduct at least sufficient current for a.c. signal modulation to provide for transmitting a.c. signals on the operating communication line. The resistive feed elements substantially accommodate differences in current flow as between one and the other of the conductors in the communication line, and/or as between the current source and the current sink paths and thereby maintain sufficient operating voltage across the current regulators to prevent saturation.

The invention provides a line circuit for coupling a.c. signals between a communication line and an a.c. signal path and for supplying the communication line with energizing current from a d.c. power supply. The line circuit includes a pair of line terminals for connection to a pair of leads in the communication line, a pair of battery terminals for connection across the d.c. power supply, a fixed impedance means, a variable current feed means, and a control circuit for controlling operation of the variable current feed means. The fixed impedance means includes a pair of resistances of predetermined value, each of the resistances being connected in series between separate ones of the line and battery terminals. The variable current feet means includes source and sink current paths, the source current path being connected in series between one of the line terminals and one of the battery terminals, and the sink current path being connected in series between the other of the line terminals and the other of the battery terminals. The source and sink current paths each exhibit a.c. impedance characteristics at the line terminals which are substantially higher than the impedance characteristics of the fixed impedance means. The source and sink current paths also include control inputs and are responsive to control signals at their respective inputs for conducting direct current between the battery terminals and the line terminals. The control circuit includes first and second outputs at which it generates the control signals such that similar flows of current are caused to flow in the source and sink current paths. The control circuit is also responsive to a.c. signals being received from the a.c. signal path to generate corresponding variations in the control signals whereby signals corresponding to the a.c. signals are transmitted along the communication line.

The invention is also a method of supplying energizing current and a.c. signals at one end of a two wire conductor communication line. The method includes the steps of conducting current from a d.c. power source via a pair of fixed resistances and the communication line, conducting current from the d.c. power source to one of the conductors in the communication line via a current source and conducting a similar current from the other conductor in the communication line via a current sink; and causing variations in the currents being conducted in the previous step in response to a.c. signals being received from a unidirectional a.c. signal path to transmit corresponding a.c. signals along the communication line.

In operation current imbalances are accommodated by the fixed resistances with the result that in normal OFF HOOK operating conditions the variable current feed means is always maintained out of saturation, and the terminating impedance for the communication line is substantially determined by the ohmic value of the fixed resistances.

An embodiment of a line circuit in accordance with the invention is described with reference to the accompanying schematic drawing which is identified as FIG. 1.

In FIG. 1 a pair of line terminals 10 provide for connection of the line circuit to TIP and RING leads of a communication line. Ancillary to the line circuit a protector circuit 11 is connected in series with resistors 12 and 13 across the line terminals 10. Protector circuits for telephone lines are generally well known to persons skilled in the telephony art and may be conveniently provided for example, by various networks including diodes, varistors, or other solid state transient voltage suppressors. The protector circuit 11 in combination with the resistors 12 and 13 each having a value of about ten to forty ohms is intended to prevent damage to the line circuit as might otherwise occur when the TIP or RING lead is subjected to induced or conducted line surges. Ringing signal is supplied to the RING lead through a ringing terminal 14, a ringing feed resistor 15, a make portion of a relay transfer contact 16 and so on by way of the resistor 12. The transfer contact 16 is associated with a relay operate coil (not shown) which when at rest effects a connection of the TIP and RING leads to the remainder of the line circuit and to a hybrid circuit 17. Many examples of electronic hybrid circuits adaptable for this application have been published. Basically the hybrid circuit provides a well known 2-wire/4-wire conversion function for voice signals between the TIP and RING leads and IN and OUT leads 18 and 19 of a voice signal path. The hybrid circuit 17 includes a unidirectional a.c. signal output 20 which provides for a.c. signal injection onto the TIP and RING leads in accordance with a.c. signals received at the IN lead 18. The hybrid circuit receives a.c. signals from the TIP and RING leads via leads 21 and 22 and in combination with a.c. signals on a lead 23 generates a.c. signals at the OUT lead 19.

A fixed impedance feed means is provided by a pair of resistors 24 and 25 of similar ohmic value. The resistor 24 is connected between a positive battery terminal 26 and the lead 22. The resistor 25 is connected between a negative battery terminal 27 and the lead 21.

A source current path is provided by a PNP transistor 28 having a base electrode, a collector electrode connected to the lead 22 and an emitter electrode connected in series with a resistor 29 to the positive battery terminal 26. A sink current path is provided by a NPN transistor 30 having a base electrode, a collector electrode connected to the lead 21 and an emitter electrode connected in series with a resistor 31 to the negative battery terminal 27.

A control circuit includes a first voltage divider, having resistors 32 and 33 connected in series with the positive battery terminal 26. A second voltage divider includes resistors 34 and 35 connected in series with the negative battery terminal 27. Junctions of the resistors 32 and 33, and 34 and 35, provide voltage taps which are connected to the base electrodes of the transistors 28 and 30 respectively. A third voltage divider includes resistors 36 and 37 connected in series between the positive and negative battery terminals 26 and 27. A differential amplifier 38 includes a non-inverting input connected to the junction of the resistors 36 and 37, and an inverting input connected to the lead 20 via a resistor 39. A transistor 40 includes a base electrode connected in common with the lead 23 and an output of the differential amplifier 38. The transistor 40 also includes an emitter electrode connected to the resistor 35 and a collector electrode connected to the resistor 33. A feedback resistor 41 is connected between the emitter electrode of the transistor 40 and the inverting input of the differential amplifier 38. A threshold detector 42 includes an input connected to the lead 21 and an output connected to an input of a buffer amplifier 43. An output of the buffer ampllifier 43 provides a path for transmission of supervisory signals to associated telephony equipment, not shown. A diode 44 includes an anode connected to the output of the threshold detector 42 and a cathode connected to the junction of the resistor 39, 41 and the inverting input of the differential amplifier 38.

In operation the line circuit performs two basic functions, that of supplying the TIP and RING leads in the communication line with energizing current and that of transmitting a.c. signals along the communication line. A primary function of the transistors 28, 30 and 40 and the differential amplifier 38 is that of transmitting the a.c. signals. However this function also involves supplying a portion of the energizing current to the communication line. Assuming that the communication line is remotely terminated by a communication device providing a direct current path between the TIP and RING leads, for example a telephone in an OFF HOOK condition, the transistor 40 is in a conducting state. Current flow through the transistor 40 is via the first and second voltage dividers. The voltage at the base electrode of the transistor 40 is reproduced, less one base emitter junction drop, at the emitter electrode of the transistor 40. The amount of current flow is substantially determined by the sum ohmic value of the resistors 34 and 35. The resistors 35 and 33 are chosen to be of similar value and likewise the resistors 32 and 34 are chosen to be of similar value. Hence the voltage developed across the resistor 32 is similar to the voltage developed across the resistor 34. The values of the resistors 29 and 31 are also chosen to be similar one with respect to the other so that currents conducted by the transistor 28 and 30 are likewise similar one with respect to the other. Ideally the respective resistors 24 and 25, 32 and 34, and 33 and 35 should be as identical as is practical. However in the present line circuit this matching of component values is not essential. Variation of up to b 5% in resistance values are tolerable. Likewise it is not essential to have the operating characteristics of the transistors 28 and 30 closely matched.

Variations in the current conducted by the transistors 28 and 30 follow variations in the current conducted by the transistor 40. The transistor 40 is in turn controlled by the a.c. signals being received on the lead 20 from the hybrid circuit 17 and amplified by the differential amplifier 38. The average current conducted by the transistors 28 and 30 is determined by the voltage at the junction of the resistors 36 and 37. The differential amplifier 38 transfers this voltage value, acting as a voltage follower, to the emitter electrode of the transistor 40. The differential amplifier also acts as an inverting amplifier for signals appearing at its inverting input and with a gain as determined by the ratio of values of the feedback resistor 41 and the resistor 39.

In summary of the operation as so far described, the current source transistor 28 and the current sink transistor 30 are operated to exhibit similar d.c. resistances and thus conduct similar direct currents to and from the RING and TIP leads respectively. However this comprises only part of the energizing current. Alternating current signal transmission is accomplished by varying the direct currents in accordance with the a.c. signals being received on the lead 20. The function of supplying the energizing current is also accomplished by the resistors 24 and 25. These resistors are chosen to be of similar value typically in a range of about 200 to 500 ohms for transmission of voice band signals. For transmission of higher frequency signals, for example digital pulse signals, the value of the resistors 24 and 25 are lower, typically in a range of 50 to 200 ohms. These resistors provide a fixed resistance feed for the communication line. Any difference as between the currents conducted by the transistors 28 and 30 is accommodated by the resistances 24 and 25. Likewise any imbalance along the communication line or in the remote communication device is compensated for by the resistors 24 and 25. This compensating function effectively prevents either of the transistors 28 or 30 from becoming saturated during normal OFF HOOK operation and hence the terminating a.c. impedance for the communication line is substantially determined by the values of the resistors 24 and 25. In the line circuit as illustrated in FIG. 1, the source and sink current paths are shown as being connected in parallel with the resistors 24 and 25 respectively. In an alternative arrangement, the source current path is connected between the positive battery terminal 26 and the lead 21 and the sink current path is connected between the negative battery terminal 27 and the lead 22. In either case the energizing current for the tip and ring leads is the algebraic sum of the current in the feed elements associated with each lead respectively.

The supervisory state of the communication line is detected by the threshold detector 42. During the OFF HOOK condition the lead 21 is of a substantial potential difference with respect to the negative battery terminal. This results in a signal at about the negative battery terminal potential being generated by the threshold detector 42. During the ON HOOK condition, there being substantially no energizing current flow, the potential on the lead 21 approaches that of the negative battery terminal. In this instance the threshold detector 42 generates a more positive signal. This signal is gated by the diode 44 to the inverting input of the differential amplifier 38 which in turn causes its output to become sufficiently negative to turn OFF the transistor 40 and thereby prevent power dissipation in the resistors 32 through 35. As communication lines of this type are active for only a small fraction of time, the reduced power dissipation in a group of these line circuits is a significant saving.

What is claimed is:

1. A line circuit for coupling a.c. signals from a unidirectional a.c. signal path to a communication line, and for supplying the communication line with energizing current from a d.c. power source, the line circuit comprising:

a pair of line terminals for connection to a pair of leads in the communication line;

a pair of battery terminals for connection across the d.c. power source;

a fixed impedance feed means including a pair of resistances of predetermined value, each of the resistances being connected in series between separate ones of the line and battery terminals;

a variable current feed means including source and sink current paths, the source current path being connected in series between one of the line terminals and one of the battery terminals and including a control input, the sink current path being connected in series between the other of the line terminals and the other of the battery terminals and including a control input at the line terminals, the source and sink current paths exhibiting a.c. impedance characteristics substantially higher than the impedance characteristic of the fixed impedance feed means, and the source and sink current paths being responsive to control signals at their respective control inputs for conducting direct current between the battery terminals and the line terminals;

a control circuit having first and second outputs connected to the control inputs of the source and sink current paths respectively, the control circuit being for generating the control signals at the first and second outputs to cause said source and sink current paths to conduct similar flows of current, the control circuit being responsive to a.c. signals on the unidirectional signal path for generating corresponding variations in the control signals whereby signals corresponding to the a.c. signals are transmitted along the communication line.

2. A line circuit as defined in claim 1 wherein each of the source and sink current paths comprises:

a transistor having a base electrode corresponding to the control input, a collector electrode connected to one of the line terminals and an emitter electrode connected in series with a resistance to one of the battery terminals; and wherein the control means comprises:

a first voltage divider having a voltage tap corresponding to said first output;

a second voltage divider having a voltage tap corresponding to said second output and being substantially similar to the first voltage divider;

a transistor having a base electrode, a collector electrode connected in series with the first voltage divider to one of the battery terminals, and an emitter electrode connected in series with the second voltage divider to the other of the battery terminals;

a differential amplifier having an output connected to the last mentioned base electrode, an inverting input for receiving the a.c. signals from said unidirectional signal path and connected via a resistance to the last mentioned emitter electrode, and a non-inverting input;

a third voltage divider connected across the battery terminals and having a voltage tap connected to the non-inverting input;

whereby the flow of current in the source and sink current paths is substantially determined by the voltage developed at the voltage tap of the third voltage divider.

3. A line circuit as defined in claim 1 wherein the control circuit includes first and second voltage dividers each having a voltage tap corresponding to said first and second outputs, and a current conducting means for conducting a predetermined current through the voltage dividers to develop similar potential differences between one of the battery terminals and the first output and between the other battery terminal and the second output.

4. A line circuit as defined in claim 3 further comprising:
- a threshold detector having an input connected to one of the line terminals and an output connected to the control, the threshold detector being for detecting the supervisory state of the line and generating an indication of same at its output; and
- wherein the control circuit is responsive to indication of an OFF HOOK supervisory state to be turned ON to generate the control signals and otherwise be turned OFF, whereby during the ON HOOK state the first and second voltage divider are prevented from loading the d.c. power source.

5. A line circuit as defined in claim 2 further comprising:
- a threshold detector having an input connected to one of the line terminals and an output, the threshold detector being responsive to supervisory states of the communication line to provide corresponding ON HOOK and OFF HOOK indications at its output;
- gating means connected between the output of the threshold detector and the one of the inputs of the differential amplifier whereby in the presence of an ON HOOK indication the differential amplifier is controlled to maintain the last mentioned transistor OFF.

6. A line circuit as defined in claims 1, 2, 3, 4 or 5 wherein the source current path is connected in parallel with one of the pair of resistances and the sink current path is connected in parallel with the other of the pair of resistances.

7. A method for supplying energizing current and a.c. signals at one end of a two conductor communication line comprising the steps of:
- (a) conducting current from a d.c. power source via a pair of fixed resistances and the communication line;
- (b) conducting current from the d.c. power source to one of the conductors in the communication line via a current source, and conducting a similar current from the other of the conductors in the communication line via a current sink;
- (c) causing variations in the currents being conducted in step (b) in response to a.c. signals being received from a unidirectional a.c. signal path;
- whereby corresponding a.c. signals are transmitted along the communication line and the communication line is terminated with an a.c. impedance as substantially determined by the ohmic value of the fixed resistances.

* * * * *